United States Patent
Arita et al.

(10) Patent No.: US 9,790,381 B2
(45) Date of Patent: Oct. 17, 2017

(54) ACTIVE ENERGY RAY CURABLE COMPOSITION, STEREOSCOPIC MODELING MATERIAL, ACTIVE ENERGY RAY CURABLE INK, INKJET INK, ACTIVE ENERGY RAY CURABLE COMPOSITION CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

(71) Applicants: Manabu Arita, Kanagawa (JP); Mie Yoshino, Kanagawa (JP)

(72) Inventors: Manabu Arita, Kanagawa (JP); Mie Yoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/081,326

(22) Filed: Mar. 25, 2016

(65) Prior Publication Data
US 2016/0326387 A1    Nov. 10, 2016

(30) Foreign Application Priority Data

May  8, 2015  (JP) ................................. 2015-095821
Jul. 27, 2015  (JP) ................................. 2015-147540

(51) Int. Cl.
| | | |
|---|---|---|
| *C09D 11/101* | (2014.01) | |
| *C08F 226/06* | (2006.01) | |
| *C08F 220/68* | (2006.01) | |
| *C08F 220/54* | (2006.01) | |

(Continued)

(52) U.S. Cl.
CPC ............ *C09D 11/101* (2013.01); *B33Y 70/00* (2014.12); *C08F 220/36* (2013.01);
(Continued)

(58) Field of Classification Search
None
See application file for complete search history.

(56) References Cited

U.S. PATENT DOCUMENTS 7,892,386 B2 *  2/2011  Platzer .................... C09D 4/00
                                                156/272.2
9,463,614 B2 * 10/2016  Okamoto ............ B29C 67/0092
(Continued)

FOREIGN PATENT DOCUMENTS

| JP | 2005139017 A | * | 6/2005 |
|---|---|---|---|
| JP | 2007-056232 | | 3/2007 |
| JP | 2008247964 A | * | 10/2008 |
| JP | 2012-219212 | | 11/2012 |
| JP | 2015-083656 | | 4/2015 |
| WO | WO2007/013368 A1 | | 2/2007 |

OTHER PUBLICATIONS

Machine translation of JP 2005-139017 A.*
Machine translation of JP 2008-247964 A.*

*Primary Examiner* — Vu A Nguyen
(74) *Attorney, Agent, or Firm* — Oblon, McClelland, Maier & Neustadt, L.L.P.

(57) ABSTRACT

An active energy ray curable composition is provided. The active energy ray curable composition includes polymerizable compounds including a first monofunctional monomer having a polar group, a second monofunctional monomer having no polar group, and a polyfunctional monomer. The homopolymer of each of the first monofunctional monomer and the second monofunctional monomer has a glass transition temperature of 50° C. or more. The first monofunctional monomer and the second monofunctional monomer account for 50% by mass or more of the polymerizable compounds in total, and the polyfunctional monomer accounts for 30% by mass or less of the polymerizable compounds.

16 Claims, 2 Drawing Sheets (51) Int. Cl.
*C09D 11/107* (2014.01)
*C09D 11/30* (2014.01)
*C08F 220/36* (2006.01)
*C09D 133/14* (2006.01)
*C08L 33/14* (2006.01)
*B33Y 70/00* (2015.01)
*B41J 11/00* (2006.01)

(52) U.S. Cl.
CPC .......... *C08F 220/54* (2013.01); *C08F 220/68* (2013.01); *C08F 226/06* (2013.01); *C08L 33/14* (2013.01); *C09D 11/107* (2013.01); *C09D 11/30* (2013.01); *C09D 133/14* (2013.01); *B41J 11/002* (2013.01)

(56) References Cited

U.S. PATENT DOCUMENTS

| | | | |
|---|---|---|---|
| 2007/0258687 A1* | 11/2007 | Yamamoto | C03C 25/1065 385/128 |
| 2010/0233448 A1* | 9/2010 | Kameyama | C09D 11/101 428/195.1 |
| 2012/0157561 A1* | 6/2012 | Gould | B41J 11/002 522/16 |
| 2014/0043679 A1* | 2/2014 | Hwang | B05D 3/065 359/463 |
| 2015/0009265 A1 | 1/2015 | Kohzuki et al. | |
| 2015/0077481 A1 | 3/2015 | Yoshino et al. | |
| 2015/0130878 A1 | 5/2015 | Kohzuki et al. | |
| 2015/0232675 A1 | 8/2015 | Yoshino et al. | |
| 2016/0009931 A1 | 1/2016 | Kohzuki et al. | |
| 2016/0075895 A1 | 3/2016 | Kohzuki et al. | |

\* cited by examiner

ACTIVE ENERGY RAY CURABLE COMPOSITION, STEREOSCOPIC MODELING MATERIAL, ACTIVE ENERGY RAY CURABLE INK, INKJET INK, ACTIVE ENERGY RAY CURABLE COMPOSITION CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

CROSS-REFERENCE TO RELATED APPLICATIONS

This patent application is based on and claims priority pursuant to 35 U.S.C. §119(a) to Japanese Patent Application Nos. 2015-095821 and 2015-147540, filed on May 8, 2015 and Jul. 27, 2015, respectively, in the Japan Patent Office, the entire disclosure of which is hereby incorporated by reference herein.

BACKGROUND

Technical Field

The present disclosure relates to an active energy ray curable composition, a stereoscopic modeling material, an active energy ray curable ink, an active energy ray curable composition container, a two-dimensional or three-dimensional image forming apparatus, a two-dimensional or three-dimensional image forming method, a cured product, and a processed product.

Description of the Related Art

Active energy ray curable inks have been used for offset printing, screen printing, and topcoat agents. Recently, active energy ray curable inks have been used in much larger amounts since they have an advantage that the cost can be reduced as the drying process is simplified. At the same time, solvent volatilization quantity can also be reduced in response to the increasing momentum of environment protection.

As an example of industrial applications, active energy ray curable inks are now widely used for printing on substrates to be processed. Thus, an image formed with an active energy ray curable ink (i.e., a cured product of the active energy ray curable ink) is required to have a good combination of adhesion to such substrates, hardness, processability (e.g., stretchability, punching processability), and rub resistance.

SUMMARY

In accordance with some embodiments of the present invention, an active energy ray curable composition is provided. The active energy ray curable composition includes polymerizable compounds including a first monofunctional monomer having a polar group, a second monofunctional monomer having no polar group, and a polyfunctional monomer. The homopolymer of each of the first monofunctional monomer and the second monofunctional monomer has a glass transition temperature of 50° C. or more. The first monofunctional monomer and the second monofunctional monomer account for 50% by mass or more of the polymerizable compounds in total, and the polyfunctional monomer accounts for 30% by mass or less of the polymerizable compounds.

In accordance with some embodiments of the present invention, a stereoscopic modeling material is provided. The stereoscopic modeling material includes the above active energy ray curable composition.

In accordance with some embodiments of the present invention, an active energy ray curable ink is provided. The active energy ray curable ink includes the above active energy ray curable composition.

In accordance with some embodiments of the present invention, an inkjet ink is provided. The inkjet ink includes the above active energy ray curable ink.

In accordance with some embodiments of the present invention, an active energy ray curable composition container is provided. The active energy ray curable composition container includes a container and the above active energy ray curable composition contained in the container.

In accordance with some embodiments of the present invention, a two-dimensional or three-dimensional image forming apparatus is provided. The two-dimensional or three-dimensional image forming apparatus includes an emitter and a container. The emitter emits an active energy ray to the above active energy ray curable composition. The container contains the above active energy ray curable composition.

In accordance with some embodiments of the present invention, a two-dimensional or three-dimensional image forming method is provided. The two-dimensional or three-dimensional image forming method includes emitting an active energy ray to the above active energy ray curable composition to cause the active energy ray composition to cure.

In accordance with some embodiments of the present invention, a cured product is provided. The cured product is produced by a method including emitting an active energy ray to the above active energy ray curable composition to cause the active energy ray composition to cure.

In accordance with some embodiments of the present invention, a processed product is provided. The processed product is produced by a method including stretching-processing or punching-processing the above cured product.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

There is a demand for an active energy ray curable composition which becomes a cured product having a good combination of strength at certain temperatures and processability (e.g., stretchability, punching processability).

In accordance with some embodiments of the present invention, an active energy ray curable composition which becomes a cured product having a good combination of strength at certain temperatures, punching processability, and stretchability is provided.

Active Energy Ray Curable Composition

The active energy ray curable composition according to an embodiment of the present invention includes polymerizable compounds including a first monofunctional monomer having a polar group, a second monofunctional monomer having no polar group, and a polyfunctional monomer. The homopolymer of each of the first monofunctional monomer and the second monofunctional monomer has a glass transition temperature of 50° C. or more. The first monofunctional monomer and the second monofunctional monomer account for 50% by mass or more of the polymerizable compounds in total, and the polyfunctional monomer accounts for 30% by mass or less of the polymerizable compounds.

The active energy ray curable composition includes a specific combination of polymerizable compounds, thereby providing a good combination of strength at certain temperatures, punching processability, and stretchability. The active energy ray curable composition is preferably used for inkjet inks that are required to have low viscosity.

To give a good combination of strength at certain temperatures and stretchability at high temperatures to the active energy ray curable composition, preferably, monofunctional monomers having a high glass transition temperature (Tg) account for a large portion of the polymerizable compounds. In addition, to give improved punching processability to the active energy ray curable composition, a polyfunctional monomer is preferably included in the polymerizable compounds. However, when monofunctional monomers having a high Tg account for a large portion of the polymerizable compounds, punching processability deteriorates, and when a polyfunctional monomer is included in the polymerizable compounds, stretchability deteriorates. The inventors of the present invention have found that when the monofunctional monomers having a high Tg include a first monofunctional monomer having a polar group and a second monofunctional monomer having no polar group, deterioration of punching processability is suppressed although the Tg of these monomers is high. Thus, the active energy ray curable composition according to an embodiment of the present invention can become a cured product having a good combination of strength at certain temperatures, punching processability, and stretchability.

Polymerizable Compounds

Polymerizable compounds generally refer to compounds which undergo a polymerization reaction by the action of active energy rays, such as ultraviolet ray and electron beam, to cure. The polymerizable compounds according to an embodiment of the present invention include at least a monofunctional monomer the homopolymer of which having a glass transition temperature of 50° C. or more and a polyfunctional monomer.

Specifically, the monofunctional monomer the homopolymer of which having a glass transition temperature of 50° C. or more includes a first monofunctional monomer having a polar group and a second monofunctional monomer having no polar group. The monofunctional monomer may further include another monofunctional monomer. In the present disclosure, monomers generally refer to polymerizable compounds which have not undergone a polymerizable reaction. The monomers are not limited in molecular weight.

Preferably, the polymerizable compounds further include a third monofunctional monomer the homopolymer of which having a glass transition temperature of less than 50° C., in addition to the first and second monofunctional monomers the homopolymer of each of which having a glass transition temperature of 50° C. or more and the polyfunctional monomer.

In the present disclosure, glass transition temperature (Tg) values of homopolymers are those disclosed in their monomer-manufacturer's catalogs, if any. Otherwise, Tg values of homopolymers are actually measured by means of differential scanning calorimetry (DSC).

Monofunctional Monomers

Generally, a polymerizable composition including monofunctional monomers as major components becomes a polymer including polymer chain network structures in small amounts. Such a polymer exhibits stretchability at or above the glass transition temperature thereof. On the other hand, as the glass transition temperature of a polymer becomes higher, the polymer chain becomes more difficult to loosen. Therefore, such a polymer having a high glass transition temperature expresses high strength and hardness at certain temperatures. From these aspects, preferably, the first and second monofunctional monomers the homopolymer of each of which having a glass transition temperature of 50° C. or more account for 50% to 80% by mass of the polymerizable compounds in total.

The higher the glass transition temperature of a polymer, the higher the upper limit temperature at and below which the polymer exerts certain strength. From this aspect, the homopolymer preferably has a glass transition temperature of 70° C. or more, more preferably 90° C. or more. It is to be noted that a higher glass transition temperature tends to degrade punching processability. The glass transition temperature is preferably adjusted keeping that fact in mind.

When only one type of monofunctional monomer accounts for 50% or more of the polymerization compounds, punching processability deteriorates significantly. Therefore, the polymerization compounds should include two or more types of monofunctional monomers. Preferably, the polymerization compounds include a first monofunctional monomer having a polar group and a second monofunctional monomer having no polar group.

Even when two or more types of monofunctional monomers are used in combination, punching processability deteriorates significantly when the blending amounts thereof are too large. Therefore, the total content rate of the monofunctional monomers in the polymerization compounds is preferably 80% by mass or less, more preferably from 50% to 70% by mass, and most preferably from 60% to 70% by mass.

Preferably, a mass ratio of the first monofunctional monomer having a polar group to the second monofunctional monomer having no polar group is in the range of from 0.33 to 3.0, more preferably from 0.4 to 2.5, and most preferably from 0.5 to 2.0.

First Monofunctional Monomer Having Polar Group

The first monofunctional monomer having a polar group is not limited in its molecular structure so long it has acrylate group and an atomic group other than hydrocarbon. Specific examples of the first monofunctional monomer having a polar group include, but are not limited to water-soluble monomers, such as acrylamide and methacrylamide compounds (e.g., acryloyl morpholine, methacryloyl morpholine, dimethyl acrylamide, isopropyl acrylamide, hydroxyethyl acrylamide, hydroxyethyl methacrylamide, dimethylamino propyl acrylamide) and N-vinylamide compounds (e.g., N-vinyl-ε-caprolactam). Each of these monomers can be used alone or in combination with others.

Among these monomers, monomers having a cyclic structure, such as acryloyl morpholine and methacryloyl morpholine, are preferable. When an ink includes such a monomer having a cyclic structure, a cured product of the ink is given certain strength and rigidity.

Second Monofunctional Monomer Having No Polar Group

The second monofunctional monomer having no polar group is not limited in its molecular structure so long as it has acrylate group but no other atomic group other than hydrocarbon. Specific examples of the second monofunctional monomer having no polar group include, but are not limited to, isobornyl acrylate, isobornyl methacrylate, adamantyl acrylate, adamantyl methacrylate, 2-methyl-2-adamantyl acrylate, 2-methyl-2-adamantyl methacrylate, dicyclopentenyl acrylate, dicyclopentenyl methacrylate, dicyclopentanyl acrylate, dicyclopentanyl methacrylate, dicyclopentenyl oxyethyl acrylate, dicyclopentenyl oxyethyl methacrylate, 3,3,5-trimethylcyclohexane acrylate, 3,3,5-trimethylcyclohexane methacrylate, and t-butyl methacrylate. Each of these monomers can be used alone or in combination with others.

Among these monomers, acrylates and methacrylates having an alicyclic structure are preferable. Specific examples of acrylates and methacrylates having an alicyclic structure include, but are not limited to, isobornyl acrylate having isobornyl ring, isobornyl methacrylate having isobornyl ring, adamantyl acrylate having adamantyl ring, adamantyl methacrylate having adamantyl ring, dicyclopentanyl acrylate, and dicyclopentanyl methacrylate. Among these compounds, isobornyl acrylate, isobornyl methacrylate, dicyclopentanyl acrylate, and dicyclopentanyl methacrylate are preferable. When an ink includes an acrylate or methacrylate having an alicyclic structure, a cured product of the ink is given certain strength and rigidity.

Polyfunctional Monomer

The polyfunctional monomer is not limited in its structure so long as it has two or more active energy ray polymerizable functional groups. Specific examples of the polyfunctional monomer include, but are not limited to, neopentyl glycol diacrylate, neopentyl glycol dimethacrylate, ethylene glycol diacrylate, ethylene glycol dimethacrylate, polyethylene glycol diacrylate, polyethylene glycol dimethacrylate, diethylene glycol diacrylate, diethylene glycol dimethacrylate, triethylene glycol diacrylate, triethylene glycol dimethacrylate, tetraethylene glycol acrylate, tetraethylene glycol dimethacrylate, polypropylene glycol diacrylate, polypropylene glycol dimethacrylate, tetramethylene glycol diacrylate, tetramethylene glycol dimethacrylate, polytetramethylene glycol diacrylate, polytetramethylene glycol dimethacrylate, propylene oxide (hereinafter "PO") adduct of bisphenol A diacrylate, PO adduct of bisphenol A dimethacrylate, ethoxylated neopentyl glycol diacrylate, ethoxylated neopentyl glycol dimethacrylate, propoxylated neopentyl glycol diacrylate, propoxylated neopentyl glycol dimethacrylate, ethylene oxide (hereinafter "EO") adduct of bisphenol A diacrylate, EO adduct of bisphenol A dimethacrylate, EO-modified pentaerythritol triacrylate, EO-modified pentaerythritol trimethacrylate, PO-modified pentaerythritol triacrylate, PO-modified pentaerythritol trimethacrylate, EO-modified pentaerythritol tetraacrylate, EO-modified pentaerythritol tetramethacrylate, PO-modified pentaerythritol tetraacrylate, PO-modified pentaerythritol tetramethacrylate, EO-modified dipentaerythritol tetraacrylate, EO-modified dipentaerythritol tetramethacrylate, PO-modified dipentaerythritol tetraacrylate, PO-modified dipentaerythritol tetramethacrylate, EO-modified trimethylolpropane triacrylate, EO-modified trimethylolpropane trimethacrylate, PO-modified trimethylolpropane triacrylate, PO-modified trimethylolpropane trimethacrylate, EO-modified tetramethylolmethane tetraacrylate, EO-modified tetramethylolmethane tetramethacrylate, PO-modified tetramethylolmethane tetraacrylate, PO-modified tetramethylolmethane tetramethacrylate, pentaerythritol triacrylate, pentaerythritol trimethacrylate, pentaerythritol tetraacrylate, pentaerythritol tetramethacrylate, dipentaerythritol tetraacrylate, dipentaerythritol tetramethacrylate, trimethylolpropane triacrylate, trimethylolpropane trimethacrylate, tetramethylolmethane tetraacrylate, tetramethylolmethane tetramethacrylate, trimethylolethane triacrylate, trimethylolethane trimethacrylate, trimethylolpropane triacrylate, trimethylolpropane trimethacrylate, bis(4-acryloxypolyethoxyphenyl)propane, bis(4-methacryloxypolyethoxyphenyl)propane, diallyl phthalate, triallyl trimellitate, 1,6-hexanediol diacrylate, 1,6-hexanediol dimethacrylate, 1,9-nonanediol diacrylate, 1,9-nonanediol dimethacrylate, 1,3-butylene glycol diacrylate, 1,3-butylene glycol dimethacrylate, 1,10-decanediol diacrylate, 1,10-decanediol dimethacrylate, hydroxypivalic acid neopentyl glycol diacrylate, hydroxypivalic acid neopentyl glycol dimethacrylate, tetramethylolmethane triacrylate, tetramethylolmethane trimethacrylate, dimethylol tricyclodecane diacrylate, dimethylol tricyclodecane dimethacrylate, modified glycerin triacrylate, modified glycerin trimethacrylate, bisphenol A glycidyl ether acrylic acid adduct, bisphenol A glycidyl ether methacrylic acid adduct, modified bisphenol A diacrylate, modified bisphenol A dimethacrylate, caprolactone-modified dipentaerythritol hexaacrylate, caprolactone-modified dipentaerythritol hexamethacrylate, dipentaerythritol hexaacrylate, dipentaerythritol hexamethacrylate, pentaerythritol triacrylate tolylene diisocyanate urethane polymer, pentaerythritol trimethacrylate tolylene diisocyanate urethane polymer, pentaerythritol triacrylate hexamethylene diisocyanate urethane polymer, pentaerythritol trimethacrylate hexamethylene diisocyanate urethane polymer, ditrimethylolpropane tetraacrylate, ditrimethylolpropane tetramethacrylate, pentaerythritol triacrylate hexamethylene diisocyanate urethane prepolymer, pentaerythritol trimethacrylate hexamethylene diisocyanate urethane prepolymer, urethane acrylate oligomer, epoxy acrylate oligomer, polyester acrylate oligomer, polyether acrylate oligomer, and silicone acrylate oligomer.

Each of these monomers can be used alone or in combination with others. Among these monomers, those having a functional group number of from 2 to 5 are preferable, and those having a functional group number of 2 are more preferable.

More specifically, urethane acrylate oligomer is preferable. Urethane acrylate oligomer is commercially available.

Specific examples of commercially-available urethane acrylate oligomer include, but are not limited to, UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (available from The Nippon Synthetic Chemical Industry Co., Ltd.); CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 (available from Tomoe Engineering Co., Ltd.); and EBECRYL 210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (available from DAICEL-ALLNEX LTD.).

It is likely that as the addition amount of the polyfunctional monomer increases, punching processability improves but stretchability decreases. As the ratio of the molecular weight to the functional group number of the polyfunctional monomer becomes larger, the above-described effects are more efficiently expressed with a smaller amount of the polyfunctional monomer. As the ratio of the molecular weight to the functional group number of the polyfunctional monomer becomes smaller, the above-described effects are less efficiently expressed. As the molecular weight of the polyfunctional monomer becomes larger, the resulting ink viscosity becomes larger. The polyfunctional polymer preferably has a weight average molecular weight of 15,000 or less.

In the present disclosure, weight average molecular weights are those converted from molecular weights of standard polystyrene samples, which are measured by a high-speed liquid chromatography system (including WATERS 2695 (main body) and WATERS 2414 (detector) available from Nihon Waters K.K.) equipped with in-line three columns SHODEX GPCKF-806L (having an exclusion limit molecular weight of $2 \times 10^7$, a separation range of from 100 to $2 \times 10^7$, and a number of theoretical plates of 10,000; filled with a filler made of a styrene-divinylbenzene copolymer having a particle diameter of 10 µm).

The content rate of the polyfunctional monomer in the polymerizable compounds is preferably from 2% to 30% by mass, more preferably from 2% to 20% by mass, and most preferably from 10% to 20% by mass. When the content rate of the polyfunctional monomer in the polymerizable compounds is in excess of 30% by mass, stretchability decreases or ink viscosity becomes extremely high. When used for inkjet inks, the content rate of the polyfunctional monomer in the polymerizable compounds is preferably 20% by mass or less.

Other Monofunctional Monomer

The polymerizable compounds may further include other monomers, such as a third monofunctional monomer the homopolymer of which having a glass transition temperature of less than 50° C.

Specific examples of the third monofunctional monomer include, but are not limited to, tetrahydrofurfuryl acrylate, tetrahydrofurfuryl methacrylate, cyclohexyl acrylate, cyclohexyl methacrylate, benzyl acrylate, benzyl methacrylate, 2-hydroxyethyl acrylate, 2-hydroxyethyl methacrylate, 2-hydroxypropyl acrylate, 2-hydroxypropyl methacrylate, 2-hydroxybutyl acrylate, isobutyl acrylate, t-butyl acrylate, phenoxyethyl acrylate, (2-methyl-2-ethyl-1,3-dioxolan-4-yl) methyl acrylate, and cyclic trimethylolpropane formal acrylate. Each of these monomers can be used alone or in combination with others.

The content rate of the third monofunctional monomer in the polymerizable compounds preferably ranges from 10% to 30% by mass. As the glass transition temperature of the homopolymer of the third monofunctional monomer becomes lower, punching processability is more improved even when the content rate of the third monofunctional monomer is small.

The homopolymer of the third monofunctional monomer preferably has a glass transition temperature of less than 50° C., more preferably 20° C. or less.

Active Energy Ray

Specific examples of the active energy ray for causing the active energy ray curable composition to cure include, but are not limited to, ultraviolet ray, electron beam, α-ray, β-ray, γ-ray, and X-ray, which are capable of giving energy to polymerizable compounds included in the active energy ray curable composition to cause a polymerization reaction. When the active energy ray is emitted from a high-energy light source, the polymerizable compounds can undergo a polymerization reaction without using a polymerization initiator. In the case of ultraviolet ray emission, a GaN-based semiconductor ultraviolet light emitting device is preferably used as the light source from both industrial and environmental aspects. In particular, use of mercury-free light sources is strongly demanded in accordance with an increasing momentum of environment preservation. In addition, ultraviolet light emitting diode (UV-LED) and ultraviolet light laser diode (UV-LD) are preferable since they are advantageous in terms of their compact size, extended lifespan, high efficiency, and low cost. In the case of ultraviolet ray emission, a photopolymerization initiator is included in the active energy ray curable composition to initiate a polymerization reaction.

Polymerization Initiator

The active energy ray curable composition may include a polymerization initiator which is capable of generating an active species, such as radial and cation, by the action of the active energy ray, to cause the polymerizable compounds included in the active energy ray curable composition to initiate a polymerization. Examples of the polymerization initiator include radical polymerization initiators and cation polymerization initiators. Further, a polymerization accelerator that accelerates a polymerization reaction may be used in combination with the polymerization initiator.

The content rate of the polymerization initiator to the total amount of the polymerizable compounds is preferably in the range of from 1% to 20% by mass, more preferably from 5% to 10% by mass.

Polymerization Accelerator

As an example of the polymerization accelerator, an amine compound can be used, in combination with a photopolymerization initiator.

Specific examples of the amine compound include, but are not limited to, ethyl p-dimethylaminobenzoate, 2-ethylhexyl p-dimethylaminobenzoate, methyl p-dimethylaminobenzoate, 2-dimethylaminoethyl benzoate, and butoxyethyl p-dimethylaminobenzoate.

Other Components

The active energy ray curable composition may further include other components, if necessary. Examples of such components include a colorant, a polymerization inhibitor, a surfactant, a photosensitizer, a diluting solvent, and a pigment dispersant.

Colorant

Various dyes and pigments can be used in view of physical properties of the active energy ray curable composition. Specific examples of the pigments include, but are not limited to, inorganic pigments and organic pigments, such as black pigments, yellow pigments, magenta pigments, cyan pigments, white pigments, and glossy color pigments (e.g., gold, silver).

Polymerization Inhibitor

Specific examples of the polymerization inhibitor include, but are not limited to, 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenyl amine, 9,10-di-n-butoxyanthracene, and 4,4'-[1,10-dioxo-1,10-decanediylbis(oxy)]bis[2,2,6,6-tetramethyl]-1-piperidinyloxy.

Surfactant

Specific examples of the surfactant include, but are not limited to, higher-fatty-acid-based surfactants, silicone-based surfactants, and fluorine-based surfactants.

Organic Solvent

The active energy ray curable composition may include an organic solvent. However, it is more preferable that the active energy ray curable composition includes no organic solvent. When the active energy ray curable composition includes no organic solvent, in other words, when the composition is VOC (volatile organic compound) free, the cured product thereof includes no residual volatile organic solvent. This improves safety at printing sites and prevents environment pollution. In the present disclosure, an organic solvent refer to a volatile organic compound (VOC), such as ether, ketone, xylene, ethyl acetate, cyclohexanone, and toluene. The organic solvent should be discriminated from a reactive monomer for diluting the composition. In the present disclosure, when the composition is stated "to include no organic solvent", it means that the composition "substantially" include no organic solvent. In this case, the content rate of the organic solvent in the composition is preferably less than 0.1% weight.

Properties of Active Energy Ray Curable Composition

Viscosity

The viscosity of the active energy ray curable composition is adjusted in accordance with the purpose of use or application. When the active energy ray curable composition is applied to a discharge device that discharges the composition from nozzles, the viscosity of the composition is preferably within the range of from 3 to 40 mPa·s, more preferably from 5 to 15 mPa·s, and most preferably from 6 to 12 mPa·s, at a temperature within the range of from 20° C. to 65° C. Preferably, the active energy ray curable composition exhibits a viscosity within the above-described range even when no organic solvent is included. Viscosity is measured with a cone-plate rotary viscometer (VISCOMETER TV-22 available from Toki Sangyo Co., Ltd.) while setting the temperature of the constant-temperature circulating water in the range of from 20° C. to 65° C. The temperature of the circulating water is adjusted by an instrument VISCOMATE VM-150III.

Static Surface Tension

The active energy ray curable composition is not limited in static surface tension. When used for inkjet ink, the active energy ray curable composition preferably has a static surface tension in the range of from 20 to 40 N/m, more preferably from 28 to 35 N/m, at 25° C.

Static surface tension is measured with a static surface tensiometer (CBVP-Z available from Kyowa Interface Science Co., Ltd.) at 25° C. The above-described preferred range of static surface tension is determined under an assumption that the composition is in an ink used for commercially-available inkjet head (e.g., GEN4 from Ricoh Printing Systems, Ltd.)

Use Application

The active energy ray curable composition can be applied to, for example, modeling resins, paints, adhesives, insulating materials, release agents, coating materials, sealing materials, resists, and optical materials.

For example, the active energy ray curable composition can be applied to an active energy ray curable ink for forming two-dimensional texts and images. As another example, the active energy ray curable composition can be applied to a stereoscopic modeling material for forming a three-dimensional image (i.e., stereoscopic modeled object).

The stereoscopic modeling material can be applied to additive manufacturing, material jetting, and optical modeling, each of which is one of stereoscopic modeling processes. In additive manufacturing, the stereoscopic modeling material is used as a binder of powder particles. In material jetting, the stereoscopic modeling material is discharged to a certain region and exposed to an active energy ray to cure, and the cured layers are sequentially laminated to form a stereoscopic object, as described in detail later referring to FIG. 2. Optical modeling is described in detail later referring to FIGS. 3A to 3D.

Stereoscopic modeling apparatuses for forming stereoscopic modeled objects with the active energy ray curable composition are not limited in structure and may include a storage for storing the active energy ray curable composition, a supplier, a discharger, and an active energy ray emitter.

Active Energy Ray Curable Composition Container

The active energy ray curable composition container according to an embodiment of the present invention includes a container and the above-described active energy ray curable composition contained in the container.

When the active energy ray curable composition is used for an ink, the active energy ray curable composition container serves as an ink cartridge or an ink bottle, which prevents user from directly contacting the ink when the user is replacing the ink, thus preventing user's fingers and clothes from being contaminated with the ink. In addition, the ink cartridge or ink bottle prevents foreign substances from being mixed into the ink. The container is not limited in shape, size, and material. Preferably, the container is made of a light-blocking material.

Two-Dimensional or Three-Dimensional Image Forming Method and Apparatus

A two-dimensional or three-dimensional image forming method according to an embodiment of the present invention includes at least the step of emitting an active energy ray to the active energy ray curable composition to cause the active energy ray curable composition to cure. A two-dimensional or three-dimensional image forming apparatus according to an embodiment of the present invention includes at least an emitter to emit an active energy ray to the active energy ray curable composition and a container to contain the active energy ray curable composition. The container included in the two-dimensional or three-dimensional image forming apparatus may be the above-described active energy ray curable composition container. The two-dimensional or three-dimensional image forming method may further include the step of discharging the active energy ray curable composition. The two-dimensional or three-dimensional image forming apparatus may further include a discharger to discharge the active energy ray curable composition. The discharging method may be of a continuous injection type or an on-demand type, but is not limited thereto. Specific examples of the on-demand-type discharging method include thermal methods and electrostatic methods.

Figure 1:
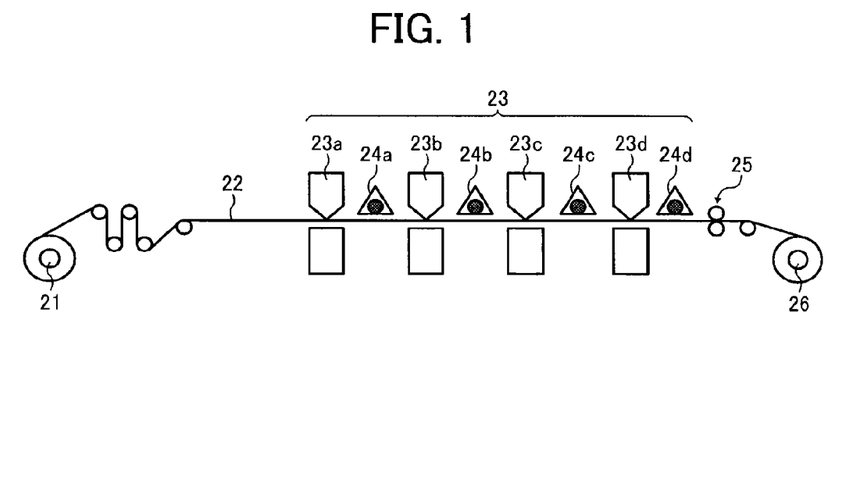
FIG. 1 is a schematic view of an image forming apparatus according to an embodiment of the present invention.

FIG. 1 is a schematic view of an image forming apparatus according to an embodiment of the present invention, which includes an inkjet discharger. The image forming apparatus illustrated in FIG. 1 includes printing units 23a, 23b, 23c, and 23d and a supply roller 21. Each of the printing units 23a, 23b, 23c, and 23d includes an ink cartridge containing an active energy ray curable ink having yellow, magenta, cyan, and black colors, respectively, and a discharge head. The inks are discharged to a recording medium 22 supplied by the supply roller 21. Light sources 24a, 24b, 24c, and 24d emit active energy rays to the respective inks on the recording medium 22 to cause the inks to cure and form color images. The recording medium 22 is then conveyed to a winding roller 26 via a processing unit 25. Each of the printing units 23a, 23b, 23c, and 23d may be equipped with a heater for liquefying the ink at the inkjet discharger. Furthermore, the printing units 23a, 23b, 23c, and 23d may be equipped with a cooler for cooling the recording medium to room temperature with or without contacting the recording medium. The image forming apparatus illustrated in FIG. 1 may be an inkjet recording apparatus employing a serial method or a line method. In the serial method, ink is discharged from a moving discharge head onto a recording medium that is intermittently moved in accordance with the width of the discharge head. In the line method, ink is discharged from a fixed discharge head onto a recording medium that is continuously moved.

Specific preferred materials for the recording medium 22 include, but are not limited to, paper, film, metal, and composite materials thereof, which may be in the form of a sheet. The image forming apparatus illustrated in FIG. 1 may be capable of either one-side printing or duplex printing.

It is possible that the light sources 24a, 24b, and 24c emit weakened active energy rays or no active energy ray and the light source 24d emits an active energy ray after multiple color images have been printed. In this case, energy consumption and cost are reduced.

Recorded matters recorded by the ink according to an embodiment of the present invention include those printed on smooth surfaces such as normal paper and resin films, those printed on irregular surfaces, and those printed on surfaces of various materials such as metal and ceramics. By laminating two-dimensional images, a partially-stereoscopic image (including two-dimensional parts and three-dimensional parts) or a stereoscopic product can be obtained.

Figure 2:
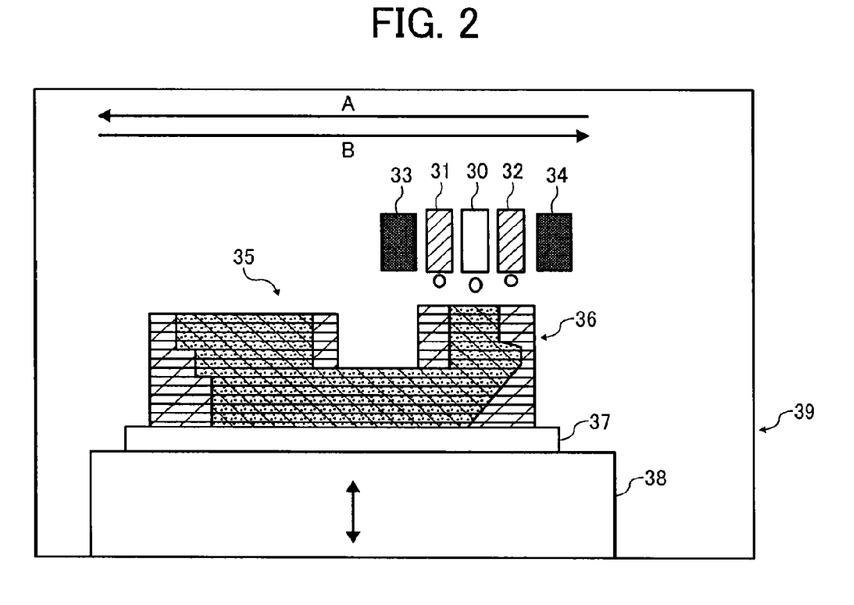
FIG. 2 is a schematic view of an image forming apparatus according to an embodiment of the present invention.
Figure 3A:
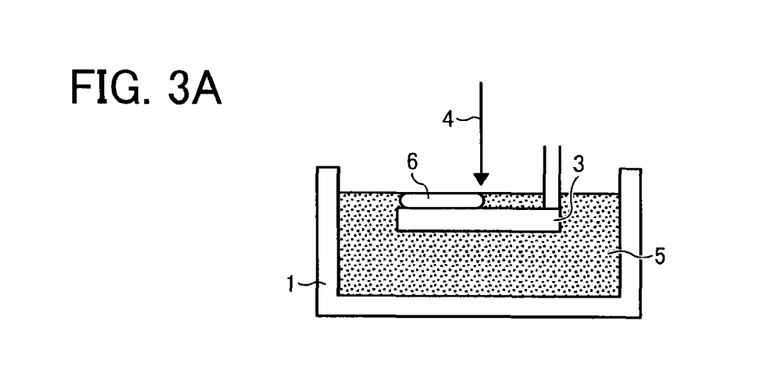
FIGS. 3A to 3D are illustrations for explaining optical modeling according to an embodiment of the present invention.
Figure 3B:
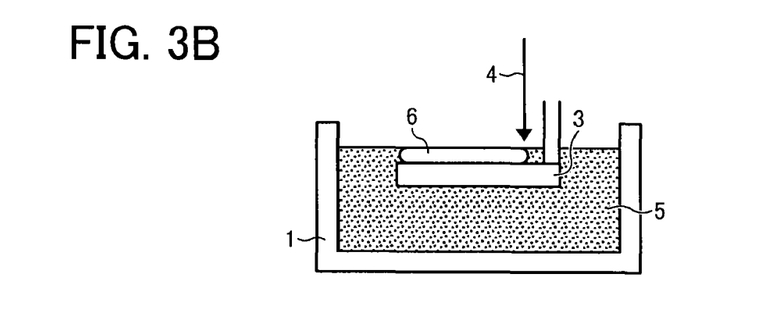
Figure 3C:
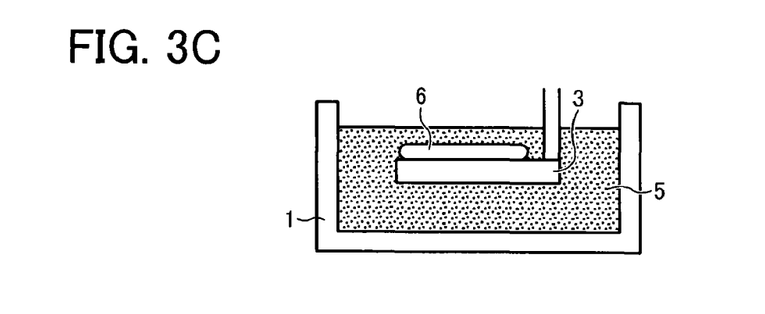
Figure 3D:
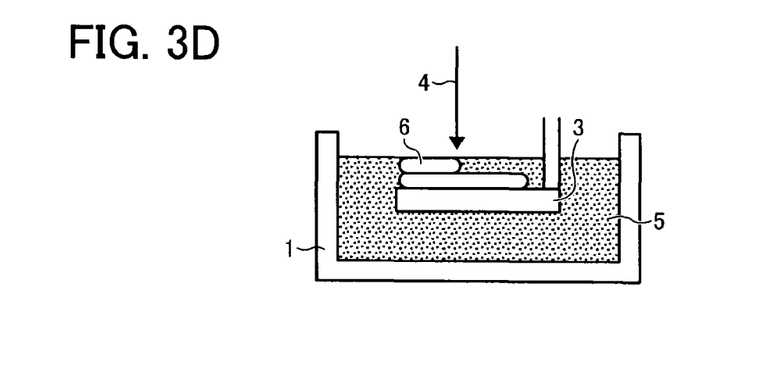

FIG. 2 is a schematic view of a three-dimensional image forming apparatus according to another embodiment of the present invention. Referring to FIG. 2, an image forming apparatus 39 includes a discharge head unit 30 for forming modeled object layers, discharge head units 31 and 32 for forming support layers, and ultraviolet emitters 33 and 34 adjacent to the discharge head units 30, 31, and 32. Each of the discharge head units 30, 31, and 32 includes an inkjet head and is movable in the directions indicated by arrows A and B in FIG. 2. The discharge head unit 30 discharges a first active energy ray curable composition, and the discharge head units 31 and 32 each discharge a second active energy ray curable composition different from the first active energy ray curable composition. The ultraviolet emitters 33 and 34 cause the active energy ray curable compositions to cure. The cured products are laminated in the image forming apparatus 39. More specifically, first, the second active energy ray curable composition is discharged from the discharge head units 31 and 32 onto a modeled object supporting substrate 37 and exposed to an active energy ray to cure, thus forming a first support layer having a reservoir. Next, the first active energy ray curable composition is discharged from the discharge head unit 30 onto the reservoir and exposed to an active energy ray to cure, thus forming a first modeled object layer. These processes are repeated multiple times, in accordance with the set number of lamination, while lowering a stage 38 that is movable in the vertical direction, to laminate the support layers and the modeled object layers. Thus, a stereoscopic modeled object 35 is obtained. A support layer lamination 36 is removed thereafter, if necessary. In the embodiment illustrated in FIG. 2, the number of discharge head unit 30 for forming modeled object layers is one. Alternatively, the number thereof may be two or more.

FIGS. 3A to 3D are illustration for explaining optical modeling, which is one example of a three-dimensional image forming method according to an embodiment of the present invention. Referring to FIGS. 3A to 3D, a stereoscopic modeling material 5 is retained in a pool 1 and exposed to an active energy ray 4 to be formed into a cured layer 6 on a movable stage 3, and the cured layers 6 are sequentially laminated to form a stereoscopic object.

Cured Product and Processed Product

The cured product according to an embodiment of the present invention is obtainable by causing the active energy ray curable composition to cure. The processed product according to an embodiment of the present invention is obtainable by processing the cured product formed on a substrate, such as a recording medium.

More specifically, the cured product according to an embodiment of the present invention is obtainable by causing the active energy ray curable composition to cure by the action of an active energy ray. For example, the cured product can be obtained by forming a coated film (image) of the active energy ray curable composition on a substrate by an inkjet discharge device and emitting ultraviolet ray to the coated film formed on the substrate to cause the coated film to rapidly cure.

The cured product preferably has a stretchability of 50% or more, more preferably 100% or more, at 180° C. Here, the stretchability is defined by the following formula: $(L2-L1)/L1$, wherein L1 represents a first length of the cured product before a tensile test and L2 represents a second length of the cured product after the tensile test.

Specific examples of the substrate for use in forming the cured product include, but are not limited to, paper, plastic, metals, ceramics, glass, and composite materials thereof.

Among these materials, plastic substrates are preferable in terms of processability. In particular, plastic films and plastic moldings are preferable, which may be made of polyethylene, polypropylene, polyethylene terephthalate, polycarbonate, ABS (acrylonitrile butadiene styrene) resin, polyvinyl chloride, polystyrene, polyester, polyamide, vinyl materials, acrylic resin, and composite materials thereof.

The processed product according to an embodiment of the present invention is obtainable by processing (e.g., stretching-processing or punching-processing) a surface-decorated article of the cured product formed on the substrate.

The processed product is preferably used for meters and operation panels of automobiles, office automation equipments, electric or electronic devices, and cameras, which typically need to be surface-decorated.

EXAMPLES

Having generally described this invention, further understanding can be obtained by reference to certain specific examples which are provided herein for the purpose of illustration only and are not intended to be limiting.

Examples 1 to 7 and Comparative Examples 1 to 8

Preparation of Active Energy Ray Curable Compositions

Active energy ray curable compositions were prepared by mixing polymerizable monomers, a photopolymerization initiator, and a carbon black, according to the formulations described in Tables 1 and 2. In Tables 1 and 2, A1 to A3, B1 to B3, C1 and C2, and D1 to D3 each represent the names of polymerizable monomers. Numerical values listed in Tables 1 and 2 represent mass ratios (%) of each polymerizable monomer based on total mass of all the monomers A1 to A3, B1 to B3, C1 and C2, and D1 to D3.

The addition amounts of the photopolymerization initiator and the carbon black are 9% by mass and 5% by mass, respectively, based on total mass of all the monomers A1 to A3, B1 to B3, C1 and C2, and D1 to D3 in all Examples and Comparative Examples.

The glass transition temperatures of the polymerizable monomers were measured in the following manner.
Measurement of Glass Transition Temperature (Tg)

The glass transition temperature (Tg) values of the homopolymers of the polymerizable monomers were those disclosed in their monomer-manufacturer's catalogs, if any. Otherwise, the Tg values of the homopolymers of the polymerizable monomers were actually measured by means of differential scanning calorimetry (DSC) as follows.

First, a polymerizable monomer was subjected to a typical liquid polymerization as follows. First, a toluene solution which contains 90 parts by mass of toluene, 10 parts by mass of a polymerizable monomer, and 0.5 parts by mass of azobis isobutyronitrile serving as a polymerization initiator was enclosed in a test tube under a nitrogen purge. The test tube was shaken in a hot bath having a temperature of 60° C. for 6 hours. Thus, a polymer was prepared. The polymer was then reprecipitated in a solvent in which the polymerizable monomer is soluble but the polymer is insoluble (e.g., methanol, petroleum ether) and isolated by filtration. The isolated polymer was subjected to a DSC measurement using an instrument DSC120U available from Seiko Instruments Inc. while setting the measurement temperature to in the range of from 30° C. to 300° C. and the temperature rising rate to 2.5° C./min.

Cured products of the above-prepared active energy ray curable compositions were prepared as follows.
Preparation of Cured Products Each active energy ray curable composition was applied to a polycarbonate film substrate (Iupilon® 100FE2000 Masking, having a thickness of 100 μm, available from Mitsubishi Engineering-Plastics Corporation) using a wire bar (Winding #6 available from Kobayashi Engineering Works, Ltd.), thus preparing a solid coated film having a thickness of about 10 μm. The solid coated film was exposed to UV-A ray (having a wavelength of from 350 to 400 nm) emitted from a UV emitter (LH6 available from Fusion UV Systems Japan K.K.) until the accumulated amount of light had become 1,000 mJ/cm². Thus, a cured product of each active energy ray curable composition was prepared.

The above-prepared cured products were subjected to evaluations of stretchability, punching processability, and strength in the following manner. Evaluation results were shown in Tables 1 and 2.
Evaluation of Stretchability Stretchability was evaluated based on a breaking elongation which is measured at 180° C. by the following tensile test. Specifically, each cured product was formed into a dumbbell-shaped specimen (No. 6) defined in JIS (Japanese Industrial Standards) K6251, and subjected to a tensile test performed with a tensile tester (AUTOGRAPH AGS-5kNX available from Shimadzu Corporation) while setting the stretching speed to 20 mm/min and the temperature to 180° C. Stretchability was determined by the following formula: (L2−L1)/L1, wherein L1 represents a first length of a specimen before the tensile test and L2 represents a second length of the specimen after the tensile test. Stretchability of 50% or more is preferable, and 100% or more is more preferable.

Evaluation Criteria

A+: not less than 200%

A: not less than 100% and less than 200%

B: not less than 50% and less than 100%

C: less than 50%

Evaluation of Punching Processability

Each cured product was punched with a punch (No. 50 available from Lion Office Products Corp.). The cut surface was observed with a microscope (Pocket Measuring Microscope X25 available from Tohkai Sangyo Co., Ltd.) to evaluate punching processability based on the following criteria.

Evaluation Criteria

A+: No crack was observed in the cut surface of the cured product.

A: Slight crack was observed in the cut surface of the cured product, but the substrate was not exposed.

B: Crack was observed in a part of the cut surface of the cured product, and a part of the substrate was exposed.

C: Significant crack and peeling was observed in the cut surface of the cured product.

Evaluation of Strength

Each cured product was left in a thermostatic chamber at a temperature of 70° C. for one day while putting a strength testing jig and a weight on the cured product. After removing the jig and the weight, the cured product was visually observed to determine whether the cured product had been deformed by the jig or not. The pressure from the weight to the cured product (i.e., the ratio of the weight to the contact area between the jig and the cured product) was 1 MPa.

Strength of the cured product was evaluated by the degree of deformation caused by the jig at 70° C. based on the following criteria.

Evaluation Criteria

A: No impression had been made by the jig.

B: An impression had been made by the jig.

C: An impression had been made by the jig. The impression had penetrated the cured product and had reached the substrate.

Details of the materials A1 to A3, B1 to B3, C1 and C2, and D1 to D3 listed in Tables 1 and 2, the photopolymerization initiator, and the carbon black are described below.

(A) Monofunctional monomers having a polar group, the homopolymer of each of which having a Tg of 50° C. or more
  A1: Acryloyl morpholine (having a Tg of 145° C.)
  A2: N-Vinyl-ε-caprolactam (having a Tg of 90° C.)
  A3: Dimethylacrylamide (having a Tg of 119° C.)

(B) Monofunctional monomers having no polar group, the homopolymer of each which having a Tg of 50° C. or more
  B1: Isobornyl acrylate (having a Tg of 97° C.)
  B2: Dicyclopentanyl acrylate (having a Tg of 120° C.)
  B3: Adamantyl acrylate (having a Tg of 153° C.)

(C) Monofunctional monomers other than (A) and (B)
  C1: Benzyl acrylate (having a Tg of 6° C.)
  C2: Tetrahydrofurfuryl acrylate (having a Tg of −15° C.)

(D) Polyfunctional monomers
  D1: 1,9-Nonanediol diacrylate
  D2: Difunctional urethane acrylate (having a weight average molecular weight of 3,000)
  D3: Difunctional urethane acrylate (having a weight average molecular weight of 4,000)

Polymerization Initiator: 2-Dimethylamino-2-(4-methylbenzyl)-1-(4-morpholine-4-yl-phenyl)butane-1-one Carbon black: A mixture of 3 parts by mass of a carbon black (MITSUBISHI® Carbon Black #10 available from Mitsubishi Chemical Corporation) and 1 part by mass of a polymer disperser (S32000 available from The Lubrizol Corporation)

TABLE 1

| | Tg | Example 1 | Example 2 | Example 3 | Example 4 | Example 5 | Example 6 | Example 7 |
|---|---|---|---|---|---|---|---|---|
| A1 | 145 | 37 | 32 | 20 | 0 | 27 | 0 | 40 |
| A2 | 90 | 0 | 0 | 0 | 35 | 0 | 17 | 0 |
| A3 | 119 | 0 | 0 | 0 | 0 | 0 | 33 | 0 |
| B1 | 97 | 0 | 0 | 14 | 0 | 0 | 21 | 0 |
| B2 | 120 | 29 | 29 | 36 | 0 | 0 | 0 | 30 |
| B3 | 153 | 0 | 0 | 0 | 32 | 29 | 0 | 0 |
| A + B | | 66 | 61 | 69 | 67 | 56 | 71 | 70 |
| C1 | 6 | 0 | 23 | 0 | 17 | 28 | 13 | 0 |
| C2 | −15 | 18 | 0 | 15 | 0 | 0 | 0 | 27 |
| D1 | | 0 | 0 | 0 | 0 | 0 | 0 | 4 |
| D2 | | 11 | 11 | 11 | 11 | 11 | 11 | 0 |
| D3 | | 5 | 5 | 5 | 5 | 5 | 5 | 0 |
| Evaluation Results | Punching Processability | A | A | A | A | A | A | B |
| | Strength | A | A | B | A | A | A | A |
| | Stretchability | A | A | A | A | A | A | A |

TABLE 2

| | Tg | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|
| A1 | 145 | 0 | 0 | 69 | 57 | 46 | 23 | 28 | 40 |
| A2 | 90 | 0 | 0 | 0 | 0 | 0 | 0 | 0 | 0 |
| A3 | 119 | 0 | 0 | 0 | 0 | 0 | 0 | 0 | 0 |
| B1 | 97 | 69 | 0 | 0 | 0 | 0 | 0 | 0 | 0 |
| B2 | 120 | 0 | 66 | 0 | 0 | 0 | 23 | 23 | 34 |
| B3 | 153 | 0 | 0 | 0 | 0 | 0 | 0 | 0 | 0 |
| A + B | | 69 | 66 | 69 | 57 | 46 | 46 | 51 | 74 |
| C1 | 6 | 15 | 18 | 15 | 26 | 38 | 38 | 17 | 26 |
| C2 | −15 | 0 | 0 | 0 | 0 | 0 | 0 | 0 | 0 |
| D1 | | 0 | 0 | 0 | 0 | 0 | 0 | 0 | 0 |
| D2 | | 11 | 11 | 11 | 11 | 11 | 11 | 23 | 0 |
| D3 | | 5 | 5 | 5 | 5 | 5 | 5 | 9 | 0 |
| Evaluation Results | Punching Processability | C | B | C | C | A | A | A+ | C |
| | Strength | C | C | A | B | C | C | A | C |
| | Stretchability | A | B | A | A | A | A | C | A+ |

Each of Comparative Examples 1 to 5 was not able to achieve a good combination of punching processability and strength, since only one of the monofunctional monomer (A) having a polar group and the monofunctional monomer (B) having no polar group was included. In particular, one or both of punching processability and strength was/were insufficient.

In each of Comparative Example 5 and 6, strength was poor since the addition amount of high-Tg monomers was too small.

In Comparative Example 7, which is similar to Example 2 except for increasing the addition amount of the polyfunctional monomer, punching processability and stretchability were sufficient but stretchability was extremely poor, since the polyfunctional monomer was excessive. In Comparative Example 8, which is similar to Example 2 except for excluding the polyfunctional monomer, stretchability was good but punching processability and stretchability were poor, since no polyfunctional monomer was included.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An active energy ray curable composition, comprising:
   polymerizable compounds including:
   a first monofunctional monomer having a polar group;
   a second monofunctional monomer having no polar group; and
   a polyfunctional monomer,
   wherein the homopolymer of each of the first monofunctional monomer and the second monofunctional monomer has a glass transition temperature of 50° C. or more,
   wherein the first monofunctional monomer and the second monofunctional monomer account for 50% by mass or more of the polymerizable compounds in total, and the polyfunctional monomer accounts for 30% by mass or less of the polymerizable compounds,
   wherein the first monofunctional monomer has an acrylate group and an atomic group other than hydrocarbon, the second monofunctional monomer has an acrylate group but no other atomic group other than hydrocarbon, and the polyfunctional monomer is a urethane acrylate oligomer,
   wherein the polymerizable compounds further include a third monofunctional monomer,
   wherein the homopolymer of the third monofunctional monomer has a glass transition temperature of less than 50° C., and
   wherein the third monofunctional monomer accounts for 10% to 30% by mass of the polymerizable compounds.

2. The active energy ray curable composition of claim 1, wherein a cured product of the active energy ray curable composition has a stretchability of 50% or more at 180° C., the stretchability being defined by the following formula:

$$(L2-L1)/L1$$

wherein L1 represents a first length of the cured product before a tensile test and L2 represents a second length of the cured product after the tensile test.

3. The active energy ray curable composition of claim 1, wherein a mass ratio of the first monofunctional monomer having a polar group to the second monofunctional monomer having no polar group ranges from 0.33 to 3.0.

4. The active energy ray curable composition of claim 1, wherein the homopolymer of each of the first monofunctional monomer and the second monofunctional monomer has a glass transition temperature of 90° C. or more.

5. The active energy ray curable composition of claim wherein the first monofunctional monomer includes at least one member selected from the group consisting of acrylamide compounds and methacrylamide compounds.

6. The active energy ray curable composition of claim 1, wherein the second monofunctional monomer includes an alicyclic acrylate or an alicyclic methacrylate.

7. A stereoscopic modeling material, comprising:
   the active energy ray curable composition of claim 1.

8. An active energy ray curable ink, comprising:
   the active energy ray curable composition of claim 1.

9. An inkjet ink, comprising:
   the active energy ray curable ink of claim 8.

10. An active energy ray curable composition container, comprising:
    a container; and
    the active energy ray curable composition of claim 1 contained in the container.

11. A two-dimensional or three-dimensional image forming apparatus, comprising:
    an emitter to emit an active energy ray to the active energy ray curable composition of claim 1; and
    a container containing the active energy ray curable composition of claim 1.

12. A two-dimensional or three-dimensional image forming method, comprising:
    emitting an active energy ray to the active energy ray curable composition of claim 1 to cause the active energy ray composition to cure.

13. A cured product, produced by a method comprising:
    emitting an active energy ray to the active energy curable composition of claim 1 to cause the active energy ray composition to cure.

14. A processed product, produced by a method comprising:
    stretching-processing or punching-processing the cured product of claim 13.

15. The active energy ray curable composition of claim 5, wherein the second monofunctional monomer includes an alicyclic acrylate or an alicyclic methacrylate.

16. The active energy ray curable composition of claim 1, wherein
    the first monofunctional monomer having a polar group is selected from acryloyl morpholine, methacryloyl morpholine, dimethyl acrylamide, isopropyl acrylamide, hydroxyethyl acrylamide, hydroxyethyl methacrylamide, and dimethylamino propyl acrylamide; and
    the second monofunctional monomer having no polar group is selected from isobornyl acrylate, isobornyl methacrylate, adamantyl acrylate, adamantyl methacrylate, 2-methyl-2-adamantyl acrylate, 2-methyl-2-adamantyl methacrylate, dicyclopentenyl acrylate, dicyclopentenyl methacrylate, dicyclopentanyl acrylate, dicyclopentanyl methacrylate, 3,3,5-trimethylcyclohexane acrylate, 3,3,5-trimethylcyclohexane methacrylate, and t-butyl methacrylate.

* * * * *